Dec. 6, 1966  N. BROWN, JR., ETAL  3,290,022
TRAP DEVICES
Filed May 29, 1964

INVENTORS.
NESTOR BROWN, JR.
JACK F. SCHMIDT.
BY
ATTORNEY.

3,290,022
TRAP DEVICES
Nestor Brown, Jr., Manlius, and Jack F. Schmidt, De Witt, N.Y., assignors to Carrier Corporation, Syracuse, N.Y., a corporation of Delaware
Filed May 29, 1964, Ser. No. 371,213
2 Claims. (Cl. 261—29)

This invention relates to trap devices, and more particularly, to trap devices employed with liquid spraying devices used in air conditioning systems to maintain a liquid seal without regard to pressure existing in the air conditioning system.

Spray coil units are frequently employed in central station air conditioning units with blow-through fans which create a positive pressure in the unit housing or with pull-through fans which create a negative pressure in the unit housing. When a manufacturer builds such a unit he has no knowledge how the unit will be utilized so that frequently a substantial problem arises during installation in connection with the installation of trap devices, for the manufacturer does not know whether the device will be subject to positive or negative pressures.

Heretofore, trap devices have been installed externally of the unit. Sometimes to assure proper operation, it was necessary to excavate a portion of the floor on which the unit was placed to assure space for the trap device and to assure its proper operation. A trap installed to seal against positive pressure cannot operate satisfactorily if negative pressure were present in the housing and vice versa.

The chief object of the present invention is to furnish a trap device providing an effective seal whether positive or negative pressures exist in the housing of the air conditioning system with which it is employed.

An object of the invention is to provide a trap device constructed as a portion of the apparatus with which it is used, thus avoiding the necessity of calculations during installation of pressures against which it need be capable of providing a liquid seal.

A further object is to provide an economical trap device which assures the apparatus with which it is employed against the loss of pressure or vacuum which might affect design operation of the apparatus. Other objects of the invention will be readily perceived from the following description.

This invention relates to overflow trap devices for use in air treating systems containing liquid spray devices for treating air directed through a housing, the housing having a sump or reservoir for collection and storage of the liquid. The trap device is located in the sump and is formed as an overflow receptacle into which liquid rising above a desired level will flow. An enclosure is formed within the receptacle having an opening adjacent the bottom of the receptacle, allowing liquid entering the enclosure to form a liquid seal at its opening. Two drain lines are provided between the exterior of the sump and the enclosure. One drain line communicates with the enclosure near its top; when pressure adjacent the surface of liquid in the receptacle is greater than ambient pressure, a column of liquid is formed in the enclosure to provide a liquid seal preventing passage of air through the line while permitting excess liquid to flow from the enclosure through the drain line.

The second drain line communicates with the enclosure adjacent its open end; when ambient pressure is greater than pressure adjacent the surface of liquid in the receptacle, a column of liquid in the enclosure provides a liquid seal thus preventing passage of air through the second line while permitting excess liquid to flow from the enclosure through the second drain line. It will be understood that when the first drain line is in use, the second drain line is sealed and vice versa.

The attached drawing illustrates a preferred embodiment of the invention, in which FIGURE 1 is a view in elevation, partly broken away, of an apparatus embodying the present invention employed under a positive pressure;

Figure 1:
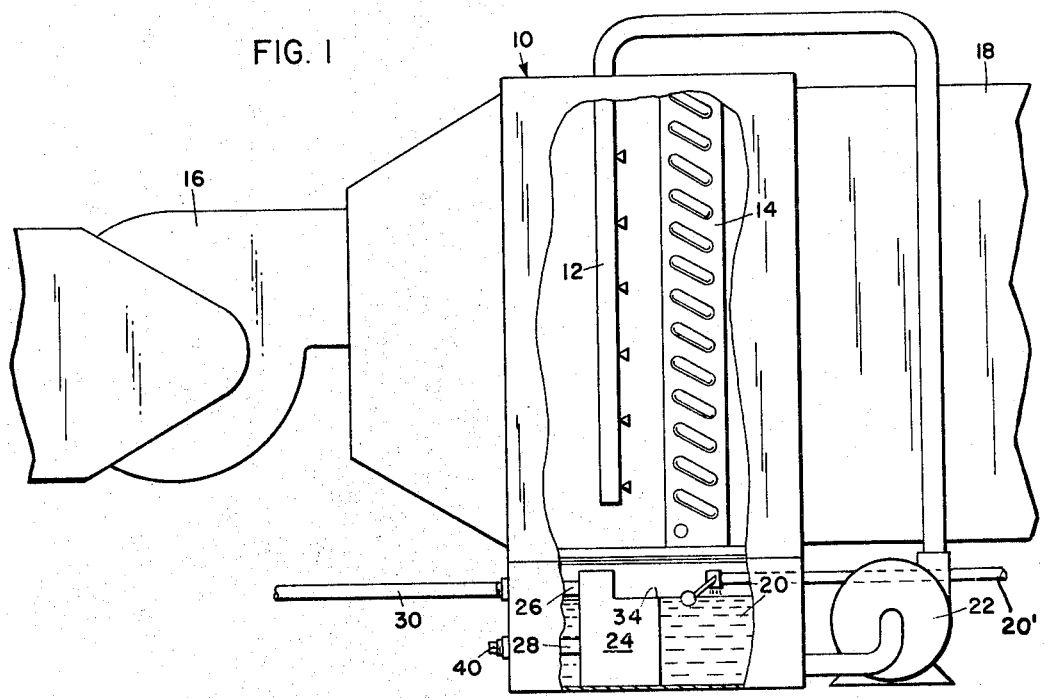

Referring to the drawing, there is shown in FIGURE 1 an air treating apparatus in which housing 10 contains spray header 12 for distributing liquid over a conditioning coil 14. Fan 16 passes air to be treated through coil 14, the treated air being discharged into a plenum 18 from which the treated air is passed to areas to be conditioned. Housing 10 includes a sump 20. Pump 22 draws liquid from the sump 20 and supplies the liquid to spray header 12 for discharge over coil 14. Sump 20 is provided with the usual liquid supply line 20' and float valve to make up any liquid lost to the system.

Figure 2:
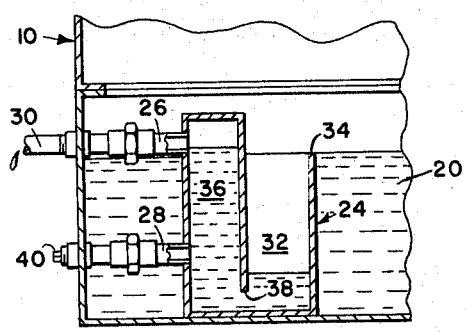
FIGURE 2 is a sectional view of the trap device employed in the apparatus of FIGURE 1.

Sump 20, as shown in FIGURES 1 and 2, contains an overflow trap device 24. The device 24 is held in place in the sump by drain lines 26 and 28. Drain lines 26 and 28 are adapted to be connected to an external drain line 30. The trap device includes a compartment 32, a wall 34 of compartment 32 serving as a weir to maintain a desired liquid level in the sump 20. Excess liquid in sump 20 flows over the weir 34 into the compartment 32. In compartment 32 a chamber 36 is provided having an open end 38 spaced from the bottom of compartment 32. The drain lines 26 and 28 communicate chamber 36 with the exterior of the sump 20, the uppermost drain line 26 communicating with chamber 36 near the top of the chamber, the lower drain line 28 communicating with the chamber 36 near its opening 38. As shown in FIGURES 1 and 2, when the housing 10 is under a positive pressure, the upper drain 26 is utilized and communicates with external drain line 30; under such conditions, drain line 28 is closed by plug 40.

As liquid in sump 20 flows over the weir 34, a liquid seal is formed at the open end 38 of chamber 36. The pressure in the housing is greater than ambient pressure; this pressure acting on the surface of the liquid in compartment 32 supports a column of liquid in chamber 36. The height of the drain line above open end 38 of chamber 36 is determined by the difference between ambient and housing pressures.

Figure 3:
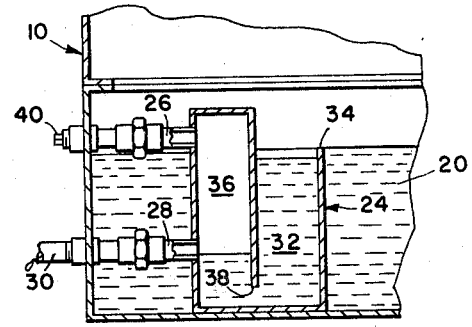
FIGURE 3 is a sectional view, similar to FIGURE 2, illustrating the trap device employed under negative pressures or vacuum existing in the apparatus with which it is utilized.
Figure 4:
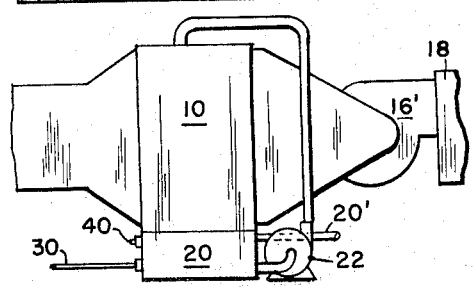
FIGURE 4 is a view in elevation of the apparatus shown in FIGURE 1 employed under a negative pressure.

When housing 10 is under a negative pressure condition, as shown in FIGURES 3 and 4, air to be treated is drawn through housing 10 by a fan 16' and forwarded to the areas to be treated. Under such conditions, the upper drain line 26 is closed by plug 40 and drain line 28 communicates with external drain line 30. The negative pressure in the housing 10 being less than ambient pressure allows the ambient pressure to enter drain lines 30 and 28 and apply its force on the surface of the liquid in chamber 36 to support a column of liquid in compartment 32. As more liquid flows over weir 34, the height of liquid in chamber 36 rises till it flows out drain line 28.

It will be understood that the device of the present invention simplifies field installation and is capable of providing a suitable liquid seal whether positive or negative pressures exist in the housing.

It will be appreciated that the invention is not limited to the type of equipment described but may be utilized with air washers or in fact any equipment which operates under positive or negative pressure conditions and requires a liquid seal be maintained during operation.

While we have described a preferred embodiment of the invention, it will be understood that the invention is not limited thereto but may be embodied within the scope of the following claims.

We claim:

1. In combination with a liquid spray device for use in air treating systems, said device including a casing, a sump, spray means and a pump to forward liquid from the sump to the spray means for discharge into an air stream directed through the casing, an overflow trap device disposed in said sump, said device including an open compartment having a wall thereof serving as a weir to maintain a desired liquid level in the sump, means forming a chamber in said compartment open toward and spaced from the bottom of the compartment, a first drain line communicating the chamber with the exterior of the casing and adapted to cooperate with the chamber to form a liquid seal in the chamber, a second drain line communicating the chamber with the exterior of the casing and adapted to cooperate with the chamber to form a liquid seal in the chamber, said first drain line being spaced a greater distance from the open end of said chamber than the second drain line whereby said first drain line is utilized for overflow liquid when pressure in casing is greater than ambient pressure and said second drain line is utilized for overflow liquid when ambient pressure is greater than pressure in the casing, and means for sealing the drain line not utilized during operation.

2. In combination with a housing, means for creating either a positive or negative pressure in said housing, a liquid sump within said housing, and an overflow trap device in said housing, said device being formed as a compartment having a wall thereof comprising a weir to maintain a desired liquid level, means forming a chamber placed within said compartment open toward and spaced from the bottom of the compartment, and a first drain line terminating in said chamber at a first level communicating said chamber with the exterior of the sump for operating under a positive pressure, and a second drain line terminating in said chamber at a level below said first drain line communicating said chamber with the exterior of the sump for operating under a negative pressure, and means for sealing the drain line not utilized during operation, said first and second drain lines cooperating with said chamber to form a liquid seal to prevent passage of air through said drain line while allowing overflow liquid to escape.

References Cited by the Examiner

UNITED STATES PATENTS

| | | | |
|---|---|---|---|
| 404,759 | 6/1889 | Whitlock | 137—247.11 X |
| 599,202 | 2/1898 | Spoon. | |
| 2,082,827 | 6/1937 | Gaber | 137—247.49 |
| 2,167,466 | 7/1939 | Shawhan et al. | 261—36 |
| 2,603,304 | 7/1952 | Carrier | 137—247.49 X |
| 2,828,761 | 4/1958 | Weibert | 261—36 X |
| 2,848,010 | 8/1958 | Touzalin | 137—247.49 X |
| 3,239,999 | 3/1966 | Price | 261—118 X |

HARRY B. THORNTON, *Primary Examiner.*

T. R. MILES, *Assistant Examiner.*